United States Patent [19]

Rouse et al.

[11] 4,274,922
[45] Jun. 23, 1981

[54] NUCLEAR REACTOR SHIELD INCLUDING MAGNESIUM OXIDE

[75] Inventors: Carl A. Rouse, Del Mar; Massoud T. Simnad, La Jolla, both of Calif.

[73] Assignee: The United States of America as represented by the United States Department of Energy, Washington, D.C.

[21] Appl. No.: 905,052

[22] Filed: May 11, 1978

[51] Int. Cl.³ .............................................. G21C 5/12
[52] U.S. Cl. ....................................... 176/87; 176/38; 176/40; 176/DIG. 2
[58] Field of Search ..................... 176/37, 38, 40, 68, 176/87, DIG. 2

[56] References Cited

U.S. PATENT DOCUMENTS

| 3,320,969 | 5/1967 | Gordon | 176/37 |
| 3,702,802 | 11/1972 | Jansen, Jr. | 176/87 X |
| 4,036,688 | 7/1972 | Golden | 176/38 |
| 4,102,739 | 7/1978 | Sayre | 176/DIG. 2 |

FOREIGN PATENT DOCUMENTS

| 2363844 | 6/1975 | Fed. Rep. of Germany | 176/38 |
| 2557884 | 6/1977 | Fed. Rep. of Germany | 176/38 |
| 2653258 | 6/1978 | Fed. Rep. of Germany | 176/38 |

Primary Examiner—Peter A. Nelson
Attorney, Agent, or Firm—Julius Tabin; Richard G. Besha; James E. Denny

[57] ABSTRACT

An improvement in nuclear reactor shielding of a type used in reactor applications involving significant amounts of fast neutron flux, the reactor shielding including means providing structural support, neutron moderator material, neutron absorber material and other components as described below, wherein at least a portion of the neutron moderator material is magnesium in the form of magnesium oxide either alone or in combination with other moderator materials such as graphite and iron.

16 Claims, 4 Drawing Figures

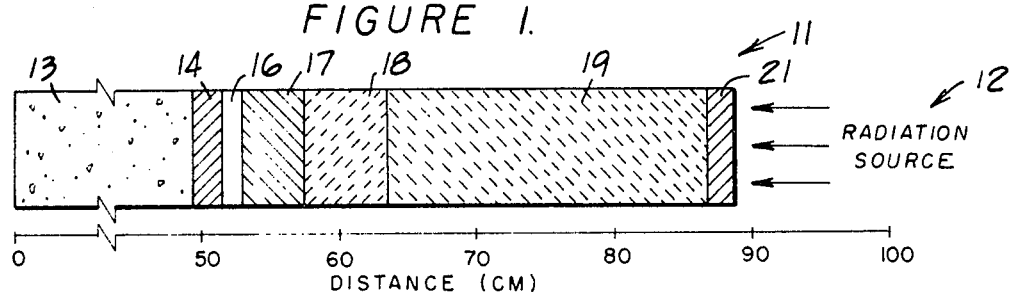
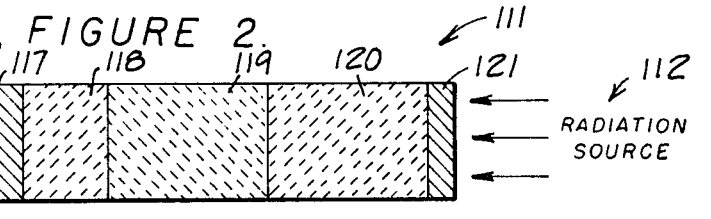
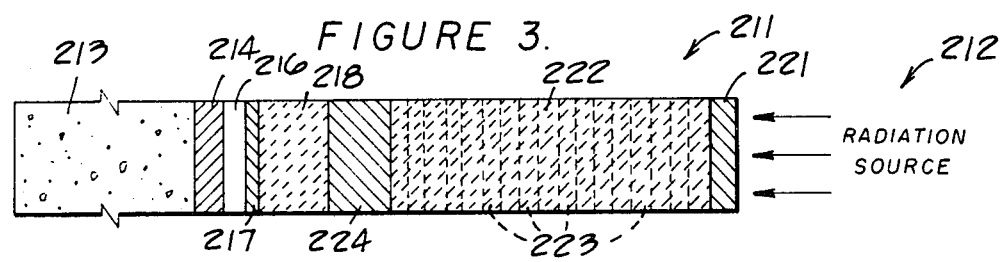
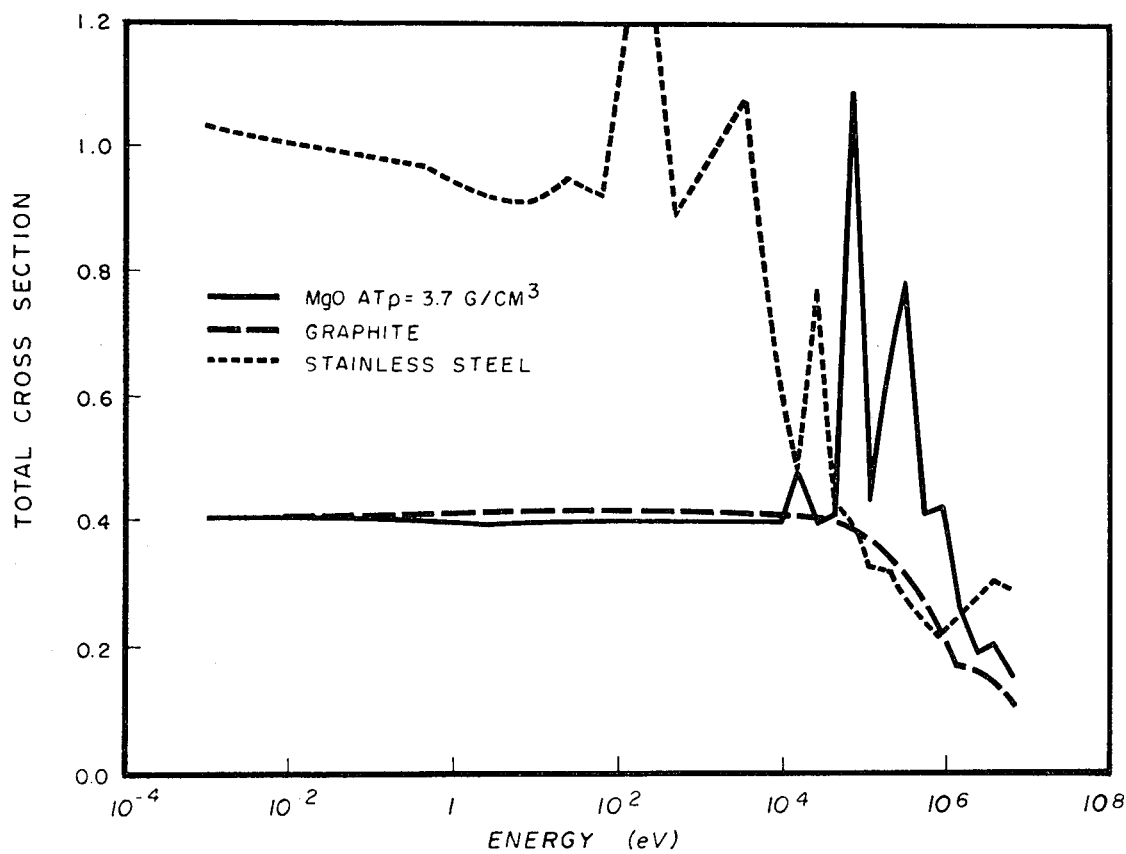

NUCLEAR REACTOR SHIELD INCLUDING MAGNESIUM OXIDE

The United States Government has rights in this invention pursuant to Contract No. DE-ATO3-76SF71023 (formerly EX-76-C-03-0167, P.A. No. 23) between the U.S. Department of Energy and General Atomic Company.

BACKGROUND OF THE INVENTION

The present invention relates to shield materials and structures for nuclear reactors which generate substantial amounts of fast neutron radiation during operation and more particularly to shield materials and structures for use in nuclear reactors of a type employed for example in power generation. In the design of nuclear reactors involving either fission or fusion reactions, provision must be made for the attenuation of escaping nuclear radiation by means of suitable shield structure. The shielding must be capable of moderating and absorbing the various types of radiation generated within the reactor. Normally the most significant types of radiation for which such shielding is required are primary neutrons and gamma rays originating within the core and secondary gamma rays produced by neutron interaction with materials external to the core such as reflector components, coolant or even materials within the shield itself.

The reactor shielding must of course provide irradiation protection for personnel in the vicinity of the reactor. However, shielding is also necessary for various other functions. For example, radiation from the reactor may interfere with the satisfactory functioning of instruments employed in various operations and control aspects of the reactor and associated components such as vapor generators and the like. Furthermore, radiation encountering the shield materials may produce internal heating and tend to cause radiation damage in various components of the shield.

Accordingly, the selection of materials and the structural design of a reactor shield is primarily dependent upon the purpose or application for the reactor itself. For example, a reactor employed to generate sufficient energy for the operation of a power station may be considered as a stationary system with the shield being a substantial or massive structure. Accordingly, the materials and structural design of the shield must be selected to moderate and absorb radiation from the reactor as well as to provide structural support for itself and related components of the reactor while also being designed to permit adequate heat transfer in order to maintain temperature levels of the shield itself within satisfactory limits.

The selection of material and structure of the shield is also largely dependent upon the specific type of radiation generated by the reactor during operation. As noted above, the present invention is contemplated for use in connection with a gas cooled, fast neutronic reactor where fast neutrons are produced in a fission process. However, it will be apparent from the following description that the invention is equally applicable for use in a variety of reactors involving substantial amounts of fast neutron generation, either from fission or fusion processes.

In a neutronic reactor of the type referred to above, neutrons generated within the reactor core may experience scattering collisions, mainly elastic, as a result of which their energy is decreased. Thereafter, they may be absorbed by various materials within the reactor core or they may escape. Depending upon the design of the reactor, neutron captures leading to fission reactions within the reactor tend to occur within specific energy ranges. If most of the fission results from the capture of thermal neutrons or neutrons of an intermediate energy range, the system may be referred to as a thermal reactor or intermediate reactor. However, if the fission process results primarily from the capture of fast neutrons, the system is generally referred to as a fast reactor.

Details concerning these various types of reactors are generally well known in the art. For purposes of the present invention, it is sufficient as noted above to indicate that the invention is particularly directed toward nuclear reactors involving substantial amounts of fast neutron generation which must be contained by suitable shielding. It will be obvious that such a reactor may also generate other types of irradiation such as thermal neutrons and gamma rays for example.

For purposes of the present invention, fast neutrons are defined as having a flux or energy of about 70 keV or greater.

In selecting the materials and structural design for suitable shielding in such reactors, it should also be kept in mind that the shielding involves a substantial volume of the overall reactor. For this reason and because of the need to assure adequate containment while avoiding excessive temperatures or radiation damage over prolonged periods of operation, efficiency and economics of a reactor may be due in large part to design and material components of the shield.

Accordingly, there has been found to remain a need for nuclear reactor shields including suitable materials and structure which permit efficient containment of reactor cores generating substantial quantities of fast neutrons.

SUMMARY OF THE INVENTION

It is therefore an object of the present invention to provide an improved nuclear reactor shield capable of efficient containment for fast neutron irradiation sources or irradiation sources involving substantial amounts of fast neutron generation. More specifically, the invention is directed toward the selection of materials and structural design for shields in large reactors of a type employed for example in electrical power generation.

Within such reactors, the shield is necessarily a massive structure with materials and overall design of the shield being suitable to provide structural support for itself and related reactor components. In addition, the shield must include suitable components for moderating and absorbing various types of irradiation from a fission or fusion source in addition to the predominant fast neutrons. Finally, the materials and structure of the shield must be selected to permit adequate heat transfer from the shield to avoid excessive temperatures, the materials and overall shield structure being selected also to resist damage due to the effects of irradiation therein.

According to the present invention, it has been found that a particularly efficient and economical reactor shield structure may be formed for use in applications involving substantial fast neutron radiation. For such applications, the present invention contemplates the use of magnesium oxide as a moderator material. The magnesium oxide may be employed alone or in combination with other moderator materials such as graphite and/or iron for example.

Magnesium or magnesium oxide has not been considered a particularly effective moderator material in the prior art. However, the total macroscopic cross section for magnesium between approximately 70 keV and 1 meV is significantly greater than that of carbon or graphite as will be discussed in greater detail below. Below that energy range, the total cross section for magnesium is only somewhat less than that of carbon or graphite while above the noted energy range, the cross sections for these materials are about equal.

Thus, the present invention contemplates that magnesium preferably in the form of magnesium oxide may be employed by itself as a moderator material in applications involving neutron radiation at energy levels of approximately 70 keV or greater. On the other hand, in applications involving a broad energy range of neutron radiation, an efficient and economical shield may be constructed employing at least a portion of magnesium oxide together with other moderator materials such as graphite and/or iron. Within such a combination, the magnesium provides efficient moderation for fast neutron flux above an energy level of about 70 keV. The other moderator material with which the magnesium is combined may be selected to produce particularly effective moderation within the same energy ranges as magnesium and/or in energy ranges below 70 keV.

It is also known that graphite and iron have been employed as moderator materials in reactor shields in the past due to physical properties such as mechanical strength and resistance to deterioration from high temperatures or interaction with radiation. Generally, magnesium materials such as magnesium oxide do not have mechanical strength as great as other moderator materials including graphite. However, it may be employed where great mechanical strength is not essential. Also, the magnesium oxide may be combined with other moderator materials in order to develop substantial mechanical strength throughout the shield.

Additional objects and advantages of the invention are made apparent in the following description having reference to the accompanying drawings.

BRIEF DESCRIPTION OF THE DRAWINGS

FIG. 1 is a partially schematic representation in section of a shield structure for use in a nuclear reactor characterized by substantial fast neutron radiation.

FIG. 2 is a similar view of another embodiment of the shield structure of the present invention.

FIG. 3 is a similar view of yet another embodiment of the shield structure of the present invention.

FIG. 4 is a graphical representation of the macroscopic cross section for magnesium oxide as well as for conventional moderating materials including graphite and stainless steel.

DESCRIPTION OF THE PREFERRED EMBODIMENTS

As noted above, the present invention particularly contemplates a shield structure for use in a nuclear reactor. The reactor may be of either a fission or fusion type characterized by substantial radiation in the form of fast neutron flux having an energy value above approximately 70 keV. In addition, the invention is particularly directed toward reactors having substantial thermal generating capacity useful in applications such as in power generating stations. A typical reactor useful in such applications may be a gas cooled fast reactor, for example. However the particular form and structure of the overall reactor is not a critical feature in connection with the present invention. Accordingly, the shield structure of the invention is illustrated in the drawings in cross section while only schematically indicating the location of the radiation source of the reactor.

Generally, shielding for such nuclear reactors is structurally self supporting, a substantial portion of the shield being concrete, preferably in the form of prestressed concrete including iron tendons to impart strength to the concrete. In addition, both the concrete and iron act as moderator materials within the shield structure.

An iron liner is commonly employed immediately adjacent the concrete portion of the shield structure for a number of purposes. Initially, the iron liner provides a form for the concrete. At the same time, the iron liner acts as a membrane to prevent migration of helium atoms into the concrete from where the atoms may escape the reactor environment. Because of this function, it is also common practice to form a gas coolant passage immediately inside the iron liner and thermal insulation to permit circulation of helium, for example, between the coolant passage and a steam generator.

Stainless steel is a good structural material as well as a good moderator material especially for low energy neutrons in an energy range below about 20 keV. Stainless steel is also commonly employed to cover the thermal insulation adjacent the iron liner.

Finally, the shield structure includes both moderator and absorber components for various types of radiation from the radiation source within the reactor. For example, boron carbide ($B_4C$) is a particularly effective absorber material for neutrons with energy well above the thermal energy range as well as for thermal neutrons. Other absorber materials such as europium hexaboride may also be used and are even better absorbers than boron. However, such materials are generally much more expensive than boron carbide and accordingly do not lend themselves as well to formation to an efficient and economical shield structure.

Finally, as noted above, the present invention particularly contemplates the use of magnesium oxide as a moderator material for fast neutrons. The magnesium oxide may also be combined with other moderator materials such as graphite and/or iron.

Various combinations of these materials within different shield structures are illustrated in FIGS. 1-3.

Referring initially to FIG. 1, a shield structure indicated at 11 is arranged to contain radiation from a source 12. As noted above, the source 12 is particularly characterized by the generation of fast neutrons. The shield structure 11 may preferably be in the form of an annular or cylindrical chamber to provide containment in all directions for the source 12. However, the shape of the shield structure is not a particular limitation of the present invention.

In any event, the shield structure 11 includes as a substantial portion a concrete component 13 which is preferably in the form of a prestressed concrete reactor vessel. The concrete 13 is commonly formed about an iron liner indicated at 14. Thermal insulation is commonly arranged in contact with the liner but is omitted from the drawing since it has only negligible effect on neutron transport. For a gas cooled fast reactor, a coolant gap indicated at 16 is commonly formed immediately inside the iron liner in order to channel heated helium gas to the steam generator.

The inside of the coolant gap 16 is commonly formed by a good structural material such as the stainless steel shell indicated at 17. The above noted components including the concrete 13, iron liner 14, coolant gap 16 and stainless steel shell 17 normally form the outer periphery of a shield structure for a reactor. Additional moderator and absorber materials are normally arranged inside these components for initial interaction with radiation from the source 12. For example, a particularly effective absorber material for thermal neutrons is boron carbide as indicated at 18. The boron carbide may be dispersed in graphite. Preferably, boron carbide pellets are arranged in a graphite matrix, the boron carbide pellets comprising approximately 30% by volume of the matrix material 18.

The shield structure 11 of FIG. 1 is particularly contemplated for use in a reactor where radiation predominantly comprises fast neutrons above the energy range of about 70 keV. Accordingly, magnesium oxide is employed by itself as the moderator material, the magnesium oxide component being indicated at 19. An internal stainless steel shell is arranged along the interior surface of the shield structure to maintain structural integrity. The internal stainless steel liner is indicated at 21.

The dimensions for the entire shield structure 11 and particularly for each of the components described above are not readily susceptible of definition since they are very dependent upon the particular characteristics of the reactor and the application within which it is to be used. However, typical dimensions for the various components (except the concrete 13 and the coolant passage 16) are illustrated in FIG. 1. The manner in which the magnesium oxide component 19 serves as a very effective moderator for fast neutrons above an energy level of about 70 keV is illustrated in FIG. 4 and is discussed in greater detail below.

Turning now to FIG. 2, a second shield structure 111 includes many components similar to those described above for FIG. 1. In particular, the arrangement of the source 112, prestressed concrete element 13, iron liner 114 and coolant gap 116 are essentially similar to the corresponding components in FIG. 1.

Within the shield structure of FIG. 2, a combined stainless steel shell and moderator component 117 is spaced apart from the iron liner 114 to form the coolant gap 116. The boron carbide absorber component 118 is substantially similar and similarly located as the absorber component 18 in FIG. 1. However, within FIG. 2, a portion of the magnesium oxide structure indicated at 19 is replaced by graphite. Accordingly the shield structure 111 of FIG. 2 includes a graphite component 119 and a magnesium oxide component 120. The magnesium oxide component 120 is arranged between the graphite component 119 and the source 112. This arrangement is dictated by the greater capability of the magnesium oxide for moderating high energy fast neutrons. As the fast neutrons radiate from the source 112, they are first subjected to scattering within the magnesium oxide component. The lower energy levels of the neutrons resulting from scattering collisions within the magnesium oxide may then be subject to more efficient moderation by the graphite component 119.

The other components of the shield structure 111 of FIG. 2 perform generally the same functions as described above in connection with FIG. 1. However, because of the combination of graphite and magnesium oxide as moderator materials initially interacting with radiation from the source 112, the shield structure of FIG. 2 is better adapted to contain a wide energy range of neutron and other types of radiation. An internal stainless steel liner 121 is also employed within the shield structure 111.

Turning now to FIG. 3, yet another shield structure 211 includes substantialy the same components as described above in connection with FIGS. 1 and 2. However, within the embodiment of FIG. 3, the basic moderator portion of the shield structure is designed to employ the superior moderating capability of magnesium oxide for fast neutrons while also imparting improved physical characteristics such as structural strength and thermal conductivity to the moderator portion of the shield structure. Accordingly, the moderator portion of the shield structure 211 of FIG. 3 includes a matrix 222 having another moderator component 223 dispersed therein. Specific examples of this combination are described immediately below. For example, the matrix 222 may be formed from graphite to provide structural strength and thermal conductivity. A suitable corresponding dispersed moderator component is magnesium oxide, preferably in the form of bars extending through the graphite in an arrangement selected to assure uniform interaction of the magnesium oxide with radiation from the source 212.

On the other hand, the moderator matrix 222 may be magnesium oxide while the dispersed moderator component 223 is an evenly spaced arrangement of iron bars to again provide structural strength and thermal conductivity.

The arrangement of iron bars within a matrix of magnesium oxide is illustrated only as a specific example. In addition, it would be possible, for example, to intimately mix the two moderator components together. The moderator matrix 222 containing the dispersed moderator component 223 could be formed from a mixture of iron oxide powder and magnesium oxide powder through which hydrogen is passed at a high temperature to reduce the iron oxide and form a sintered dispersion of iron and magnesium oxide.

The internal stainless steel liner 221, the concrete 213, iron liner 214 and coolant gap 216 again perform the same functions as described above in connection with FIGS. 1 and 2. However, within the embodiment of FIG. 3, only a thin stainless steel shell 217 is formed adjacent the coolant gap 216. The thin stainless steel shell 217 is intended to perform only the function of forming the coolant gap 216. A stainless steel element 224 is disposed inside of the boron carbide absorber component 218.

The above arrangement is preferred in certain applications for fast neutron reactors. In such reactors, substantial downscattering of the neutrons occurs within the concrete 213 and the iron liner 214. Some of the downscattering products formed within the concrete and iron liner are radiated in reverse toward the source 212. Accordingly, the boron carbide absorber element 218 is arranged externally of the stainless steel element 224 to assure absorption of a greater percentage of these downscattered products within the boron carbide. Neutron radiation passing through the moderator matrix 222 is generally at a higher energy level so that a lesser degree of absorption tends to take place within the stainless steel as the neutrons pass outwardly therethrough.

Accordingly, reversal of the stainless steel and boron carbide absorber tends to prevent the development of excessive temperatures and excessive radiation damage within the stainless steel component 224 due to interaction with low energy neutrons.

It is important to note that the reversed arrangement of the stainless steel and boron carbide absorber material can be employed for any combination of moderator materials arranged between those elements and the source of radiation. For example, the reversal of the stainless steel and boron carbide absorber elements would be equally desirable in a shielding arrangement employing only graphite as well as the novel shielding of the present invention which includes magnesium oxide.

The relative effectiveness of various moderator materials in accordance with the present invention is illustrated in FIG. 4. The macroscopic cross section of magnesium oxide is illustrated along with the cross section for typical moderator materials including graphite and stainless steel. As may be seen, magnesium oxide provides much better moderation above energy levels of approximately 70 keV. Stainless steel provides a particularly effective moderator for lower energy neutrons while graphite is approximately equal to magnesium oxide at the lower energy levels but substantially poorer than the magnesium oxide at the higher energy levels noted above. Graphite may be employed in the manner described above to impart other important characteristics such as structural strength and thermal conductivity to a shield structure for a nuclear reactor.

The macroscopic cross section illustrated for magnesium in FIG. 4 is based upon a density of 3.7 grams per cc. This is generally the most effective density of magnesium oxide, both as a moderator material and in terms of structural integrity. However, magnesium oxide at this density is relatively difficult to manufacture and thus quite expensive. Accordingly, it is also possible to employ lower densities of magnesium oxide while achieving generally similar absorption characteristics. In any event, the selection of density for the magnesium oxide is another factor to be considered in connection with the specific application for each individual reactor design.

Other combinations of moderator materials may also be employed as well as those specifically described herein. In addition, other modifications and variations are also apparent within the scope of the present invention which is accordingly defined only by the following appended claims.

What is claimed is:

1. In a shield structure for a nuclear reactor characterized by substantial radiation of fast neutrons above an energy level of approximately 70 keV, the shield structure including means providing structural integrity, neutron absorption capability and at least limited neutron moderator capability, a substantial thickness of neutron moderator material being arranged adjacent an inner edge of the shield structure closest to the source of fast neutrons within the reactor, the improvement comprising the use of magnesium oxide as at least a substantial component of the moderator material of the shield structure.

2. The shield structure of claim 1 wherein the moderator components of the shield structure include magnesium oxide adjacent the source of fast neutrons within the reactor and another moderator material selected from the class consisting of graphite and iron formed as a component of the shield structure opposite the magnesium oxide from the source of fast neutrons.

3. The shield structure of claim 1 wherein the moderator material of the shield structure comprises graphite to impart structural strength and thermal conductivity with magnesium oxide being dispersed uniformly throughout the graphite.

4. The shield structure of claim 3 wherein the magnesium oxide is in the form of bars evenly spaced throughout the graphite.

5. The shield structure of claim 1 wherein the moderator material of the shield structure is magnesium oxide with another moderator material dispersed therethrough to impart structural strength and thermal conductivity.

6. The shield structure of claim 5 wherein the other moderator material is preferably in the form of iron bars uniformly spaced throughout the magnesium oxide.

7. The shield structure of claim 1 wherein the moderator material of the shield structure is a mixture of magnesium oxide and iron.

8. The shield structure of claim 1 wherein a neutron absorber material is arranged externally of the moderator material relative to the source.

9. The shield structure of claim 8 wherein an iron liner and concrete vessel are arranged outwardly of the absorber material from the source, a structural stainless steel shell being arranged intermediate the absorber material and moderator material to provide structural integrity for the shield structure, the absorber material being arranged between the concrete and stainless steel shell to prevent a substantial portion of back scattering from the concrete into the stainless steel shell.

10. The shield structure of claim 9 wherein the neutron absorber material includes boron.

11. The shield structure of claim 8 wherein the absorber material includes boron.

12. In a shield structure for a nuclear reactor characterized by substantial radiation of fast neutrons, the shield structure including means providing structural integrity, neutron absorption capability and at least limited neutron moderator capability, a substantial thickness of neutron moderator material being arranged adjacent an inner edge of the shield structure closest to the source of fast neutrons within the reactor, an iron liner and concrete vessel being arranged outwardly of the absorber material from the source, a structural stainless steel shell being arranged intermediate the absorber material and moderator material to provide structural integrity for the shield structure, the improvement comprising the absorber material being arranged between the concrete and stainless steel shell to prevent a substantial portion of back scattering into the stainless steel shell.

13. The structure of claim 12 further comprising magnesium oxide as at least a substantial component of the moderator material of the shield structure.

14. The shield structure of claim 12 further comprising graphite as at least a substantial component of the moderator material of the shield structure.

15. In a reactor including a radiation source characterized by the generation of substantial quantities of fast neutrons having an energy level above approximately 70. keV, the reactor further being characterized by the capability of substantial thermal generation suitable for use in power stations and including a shield structure for containing the radiation source, the shield structure including an iron liner forming a helium membrane as well as a basic configuration of the shield structure, prestressed concrete being formed outside of the iron liner as a reactor vessel, a coolant gap being formed immediately inside the iron liner to permit the removal of heat from the shield structure, additional neutron absorber and neutron moderator materials being arranged inside the coolant gap for interacting with fast neutrons from the radiation source, the moderator material including magnesium oxide and being arranged generally adjacent an inner portion of the shield structure for initial interaction with fast neutrons from the source, a neutron absorber material being arranged between the magnesium oxide and the coolant gap.

16. The shield structure of claim 15 further comprising a stainless steel shell arranged intermediate the coolant gap and the neutron absorber material to act as a neutron moderator and to structurally form the coolant gap in combination with the iron liner.

* * * * *